United States Patent
Niwa et al.

(10) Patent No.: US 6,328,513 B1
(45) Date of Patent: Dec. 11, 2001

(54) VIBRATION FLOATING WASHER ASSEMBLY AND METHOD OF ATTACHING THE SAME TO HEAT INSULATING PLATE

(75) Inventors: Takahiro Niwa, Ota-ku; Masafumi Tanaka, Yokohama; Hiroto Sugai, Nerima-ku, all of (JP)

(73) Assignee: Nichias Corporation, Tokyo (JP)

(*) Notice: Subject to any disclaimer, the term of this patent is extended or adjusted under 35 U.S.C. 154(b) by 0 days.

(21) Appl. No.: 09/573,963

(22) Filed: May 19, 2000

(30) Foreign Application Priority Data

May 19, 1999 (JP) .................................................. 11-139230

(51) Int. Cl.[7] .............................. F16B 43/00; F16L 5/00
(52) U.S. Cl. ......................... 411/339; 411/371.1; 16/2.1
(58) Field of Search .................................. 411/338, 339, 411/371.1, 542; 16/2.1

(56) References Cited

U.S. PATENT DOCUMENTS

| | | | |
|---|---|---|---|
| 3,622,194 | * | 11/1971 | Bryk . |
| 4,295,691 | * | 10/1981 | Rubenthaler . |
| 4,445,594 | * | 5/1984 | Hoffman . |
| 4,921,371 | * | 5/1990 | Boiraeu . |
| 5,069,586 | * | 12/1991 | Casey . |

FOREIGN PATENT DOCUMENTS

| | | |
|---|---|---|
| 1655607 | 6/1970 | (DE) . |
| 1389731 | 4/1975 | (DE) . |
| 197 16 733A1 | 10/1998 | (DE) . |

OTHER PUBLICATIONS

European Search Report.

* cited by examiner

Primary Examiner—Flemming Saether
(74) Attorney, Agent, or Firm—Pillsbury Winthrop

(57) ABSTRACT

A method of attaching a vibration floating washer with a sleeve to a heat insulating plate including an attaching-bolt insertion hole. The method comprises: disposing the metallic damping element on an inner side and a peripheral edge portion of the attaching-bolt insertion hole; inserting a male sleeve of a male washer and a female sleeve of a female washer respectively into the bolt insertion hole from both sides of the heat insulating plate; and fitting and fixing the male washer and the female washers to each other with a fitting portion provided on at least one of the male sleeve and the female sleeve so that the heat insulating plate is maintained in a state of noncontact with both the male washer and the female washer.

8 Claims, 7 Drawing Sheets

PRIOR ART

VIBRATION FLOATING WASHER ASSEMBLY AND METHOD OF ATTACHING THE SAME TO HEAT INSULATING PLATE

BACKGROUND OF THE INVENTION

1. Field of the Invention

The present invention relates to a vibration floating washer assembly and a method of attaching a vibration floating washer to a heat insulating plate. More particularly to a vibration floating washer assembly for vibration isolation and a method of attaching a vibration floating washer for vibration isolation to a heat insulating plate which is attached to a heat generating source in an automobile.

2. Description of the Related Art

Since the temperature of an exhaust manifold, an EGR (exhaust gas recirculator) a catalyst, a muffler, and the like of an automobile becomes high, these memers are provided with heat insulating plates for prevention of burns or heat damage to other component parts. However, if the heat insulating plates are directly attached to these members, the heat insulating plates serve as vibrating plates and constitute causes for the generation of noise.

For example, as shown in FIG. 7, an attaching method has been adopted in which a heat insulating plate 5 is arranged with a vibration floating washer structure by using a washer 1 with a sleeve, a pair of metallic cushioning materials 2, a washer 3, and an attaching bolt 4.

However, to attach the heat insulating plate 5 on a heat generating source to be attached to in an assembly line by this attaching method, the heat insulating plate 5 is first placed between the pair of metallic cushioning platez 2 arranged around a peripheral edge portion of an attaching-bolt insertion hole 6 in the heat insulating plate 5. The washer 3 is then placed on one side of the cushioning material 2, and a sleeve 7 of the washer 1 with a sleeve is inserted in the insertion hole 6 irom the opposite side of the insertion hole 6.

Then, in this state, since the washers 1 and 3 and the cushioning materials 2 are not fixed to the insertion hole 6, it has been necessary to insert the attaching bolt 4 into the insertion hole 6 and fix the attaching bolt 4 to a supporting portion 8 while manually holding and fixing the washers 1 and 3 and the like. This method is inefficient, and the positioning of the attaching bolt 4 and the bolt hole in the supporting portion 8 has involved extreme difficulty.

SUMMARY OF THE INVENTION

The present invention is aimed at overcoming the above-described problems, and is characterized by attaching in advance a washer with a sleeve, including a sale washer and a female washer, to an inner side and a peripheral edge portion of an attaching-bolt insertion hole in a heat insulating plate with a metallic cushioning material placed therebetween. A primary object of the present invention is to simplify the operation of attaching the heat insulating plate to a supporting portion to be attached to.

To attain the above object, in accordance with a first aspect of the present invention, there is provided a method of attaching a vibration floating washer with a sleeve to an inner side and a peripheral edge portion of an attaching-bolt insertion hole in a heat insulating plate with a metallic cushioning material placed therebetween, characterized in that the cushioning material is disposed on the inner side the peripheral edge portion of the attaching-bolt insertion hole, that a male sleeve of a male washer and a female sleeve of a female washer are respectively inserted into the bolt insertion hole from both sides of the heat insulating plate, the male washer and the female washer constituting the vibration floating washer with a sleeve, and that the male washer and the female washer are fitted and fixed to each other by means of fitting means provided on at least one of the male sleeve and the female sleeve while the heat insulating plate is maintained in a state of noncontact with both the male washer and the female washer. In accordance with a second aspect of the present invention, the fitting means provided on at least one of the male sleeve and the;female sleeve is one of an annular projecting portion and a discontinuous projecting portion.

In addition, in accordance with a third aspect of the present invention, the metallic cushioning material comprises a male cushioning material and a female cushioning material, and the male cushioning material has a projecting cross-sectional shape with an axially projecting portion formed thereon, while the female cushioning material has a recessed cross-sectional shape with an axially recessed portion formed therein, both the male cushioning material and the female cushioning material having respective through holes through which the male and female sleeves of the vibration floating washer with a sleeve are passed. In accordance with a fourth aspect of the present invention, the metallic cushioning material is molded by compression molding an SUS mesh.

Furthermore, there is provided a vibration floating washer assembly for being attached to a heat insulating plate including an attaching-bolt insertion hole. The washer assembly comprising: a vibration floating washer with a sleeve is and a metallic damping element placed between the vibration floating washer. The vibration floating washer includes a male washer including a male sleeve and a female washer including a female sleeve. At least one of the male and female sleeves includes a fitting portion provided thereon so that the heat insulating plate is maintained in a state of noncontact with both the male and female washers.

In accordance with the present invention, prior to attaching the heat insulating material to the supporting portion, the vibration floating washer with a sleeve, in which the male washer and the female washer can be fitted and fixed to each other by one or the fitting means, is attached and fixed, in advance, to the inner side and the peripheral edge portion of the attaching-bolt insertion hole in the heat insulating plate with the metallic cushioning material placed there between. Accordingly, it is possible to simplify the operation of attaching the heat insulating plate to the supporting portion to be attached to. Further, it is possible to reduce the vibration and facilitate the positional alignment between the attaching bolt and the bolt hole in the supporting portion.

DETAILED DESCRIPTION OF THE PREFERRED EMBODIMENTS

Figure 1:
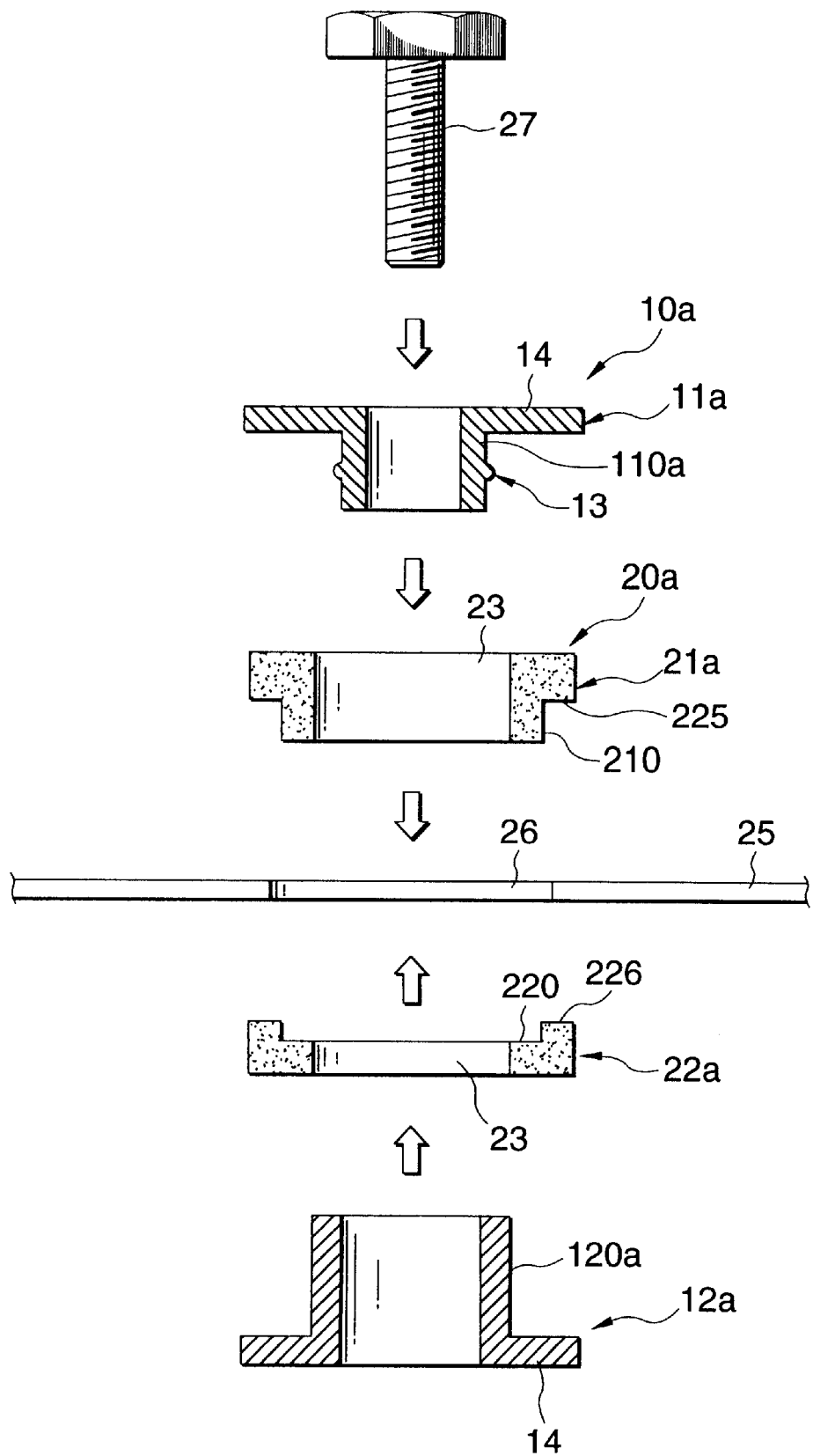
FIG. 1 is an explanatory exploded view illustrating the attaching method of the present invention.
Figure 2:
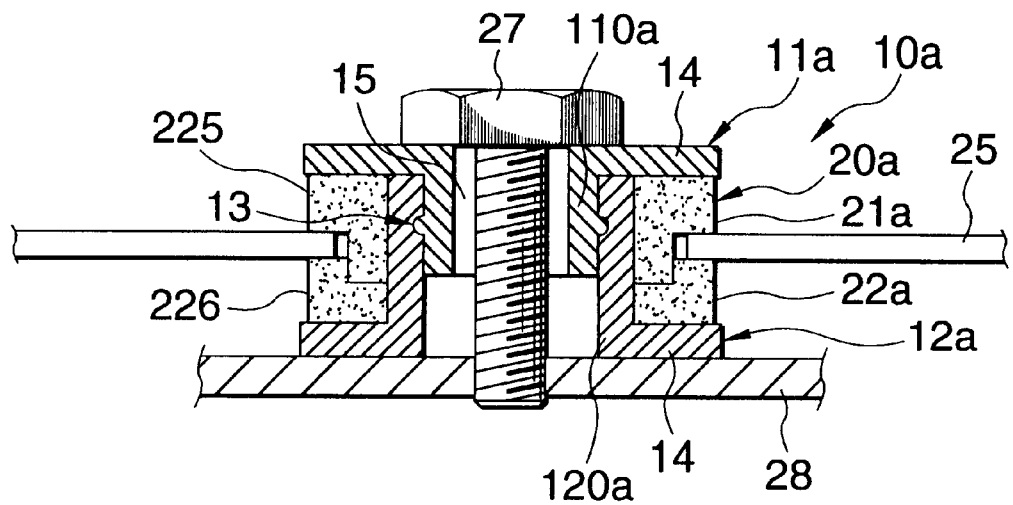
FIG. 2 is an explanatory vertical cross-sectional view illustrating the state of attachment by the attaching method shown in FIG. 1.
Figure 3:
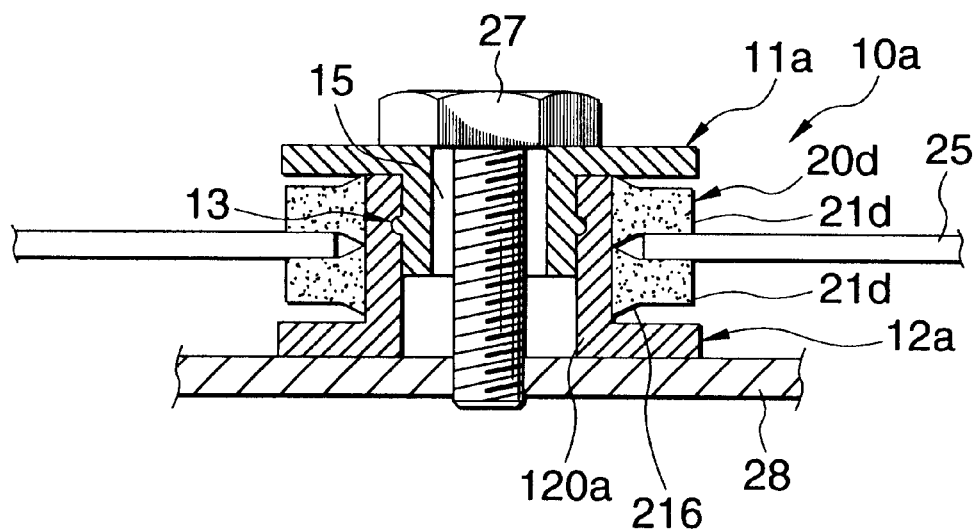
FIG. 3 is an explanatory vertical cross-sectional view illustrating the state of attachment using a different metallic cushioning material.
Figure 4A:
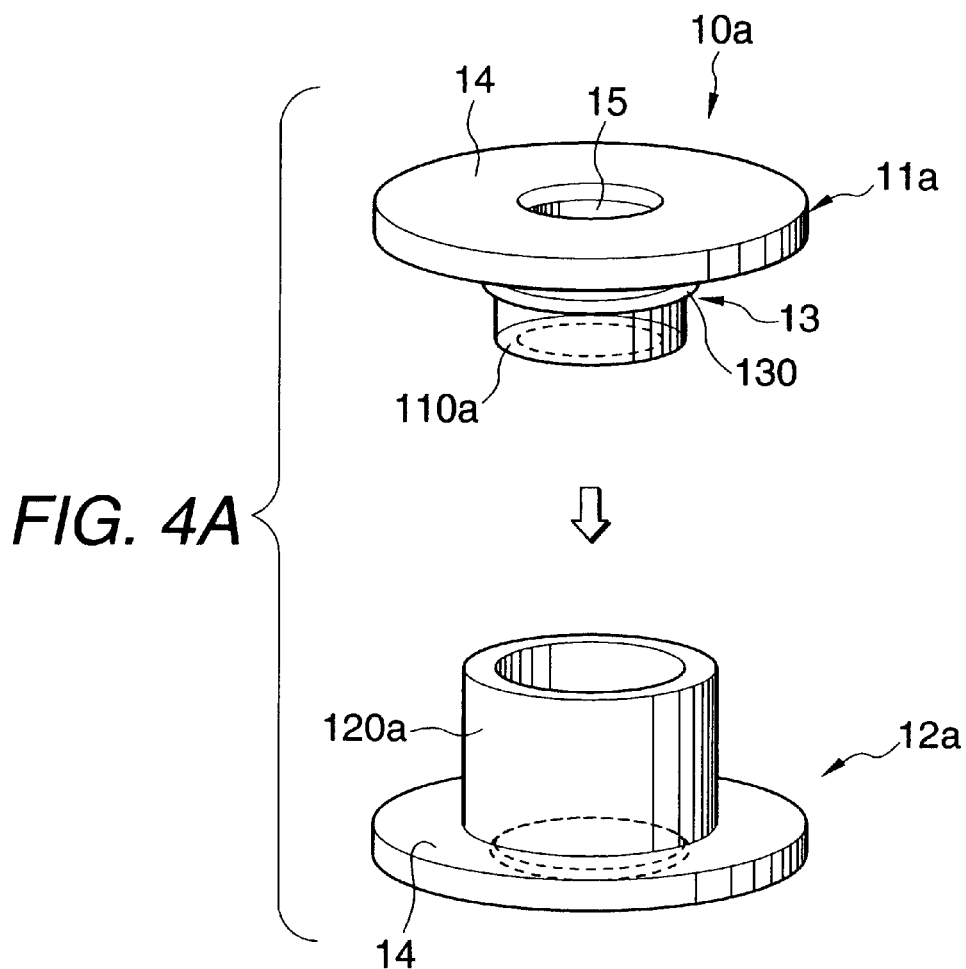
FIGS. 4A to 4C are explanatory diagrams illustrating examples of a vibration floating washer with a sleeve.
Figure 4B:
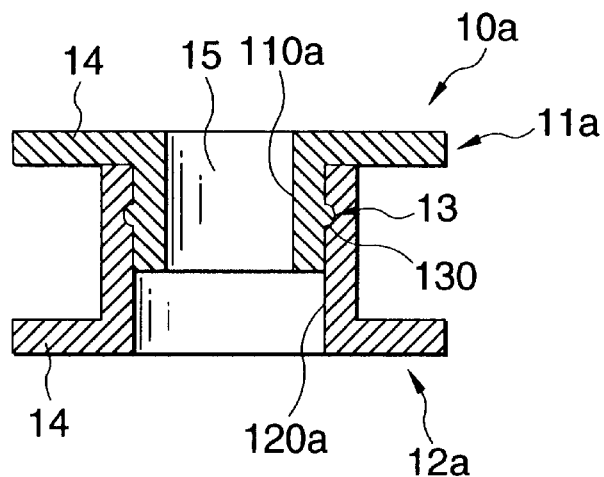
Figure 4C:
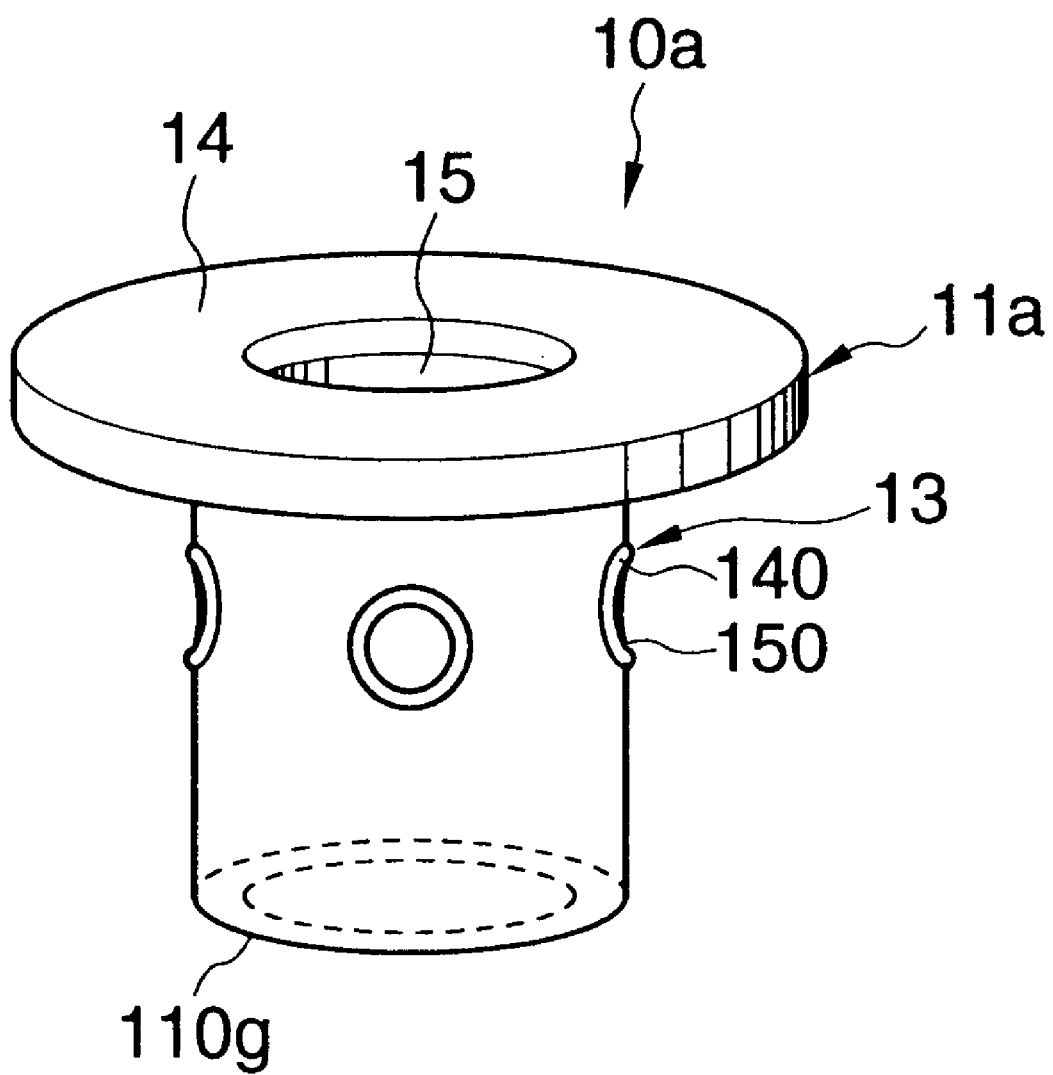
Figure 5A:
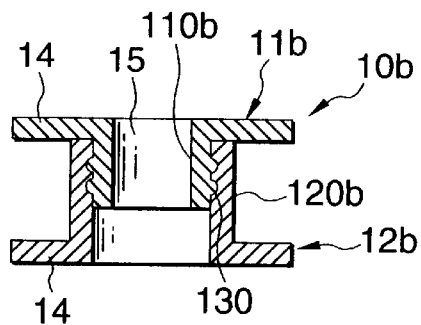
FIGS. 5A to 5E are explanatory vertical cross-sectional views illustrating other examples of the vibration floating washer with a sleeve.
Figure 5B:
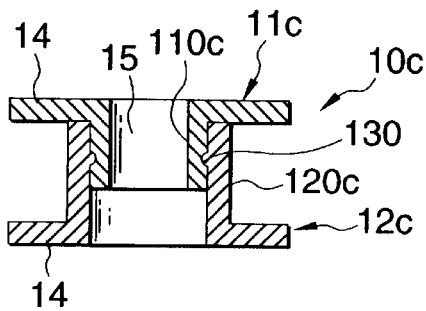

A description Will now be given of each embodiment of the present invention with reference to the drawings. FIG. 1 is an explanatory exploded view illustrating a vibration floating washer assembly and an attaching method of the present invention. FIG. 2 is an explanatory vertical cross-sectional view illustrating the state of attachment by the attaching method shown in FIG. 1. FIG. 3 is an explanatory vertical cross-sectional view illustrating the state of attachment using a different metallic cushioning material. FIGS. 4A and 4B are explanatory diagrams illustrating one example of a vibration floating washer with a sleeve, and FIG. 4C is an explanatory diagrams illustrating another example of a male sleeve of a vibration floating washer with a sleeve. FIGS. 5A to 5B are explanatory vertical cross-sectional views illustrating other examples of the vibration floating washer with a sleeve. FIGS. 6A and 6B to 6D are an exploded perspective view and exploded vertical cross-sectional views illustrating examples of the metallic cushioning material, respectively.

First, a description will be given of the vibration floating washer with a sleeve which is used in the present invention. FIGS. 4A and 4B show one example of the vibration floating washer with a sleeve, in which FIG. 4A is an exploded explanatory view, and FIG. 4B is an explanatory vertical cross-sectional view illustrating an assembled state FIG. 4C is an explanatory diagrams illustrating another example of a male sleeve of a vibration floating washer with a sleeve A vibration floating washer 10$a$ with a sleeve includes a male washer 11$a$ and a female washer 120$a$. In the illustrated case, if a male sleeve 110$a$ of the male washer 11$a$ is inserted to the inner side of a female sleeve 120$a$ of the female washer 12$a$, the vibration floating washer 10$a$ with a sleeve is formed in which both sleeves 110$a$ and 120$a$ are fitted and fixed together by a fitting portion 13 provided on the outer periphery of the male sleeve 110$a$.

Namely, the aforementioned male sleeve 110$a$ has an outside diameter smaller than the inside diameter of the female sleeve 120$a$. As an example of the fitting portions 13, an annular protrusion 130 whose outside diameter is slightly larger than the inside diameter of the female sleeve 120$a$ is formed on the outer periphery of the male sleeve 110$a$. For this reason, if the male sleeve 110$a$ is inserted in the female sleeve 120$a$ with a fixed pressing force, the vibration floating washer 10$a$ with a sleeve in which the two members are firmly fitted together by the annular protrusion 130 is formed. Only one annular protrusion 130 is provided in the illustrated case, but two or more annular protrusions 130 may be provided, or a plurality of discontinuous protrusions may be fored. Thus, it is possible to use an arbitrary fitting shapes such as inclined discontinuous protrusions or regular or irregular protrusions. In the drawings, reference numeral 14 denotes a collar portion, and numeral 15 denotes a bolt hole.

In FIG. 4C, another example of a male alecve 110$g$ is shown. In this example, a fitting portion 13 is provided as a circular protrusion 140 on the periphery of each hole 150. The circular protrusion 140 has functions similar to ones of the annular protrusion 130 shown in FIGS. 4A and 4C.

FIGS. 5A to 5E illustrate examples different from the above-described vibration floating washer 10$a$ with a sleeve. Although their basic construction is the same, there are differences in specific modes.

A vibration floating washer 10$b$ with a sleeve shown in FIG. 5A has two annular protrusions 130 formed on an outer periphery of a male sleeve 110$b$. A vibration floating washer 10$c$ with a sleeve shown in FIG. 5B has a single annular protrusion 130 formed on an inner periphery of a female sleeve 120$c$.

Figure 5C:
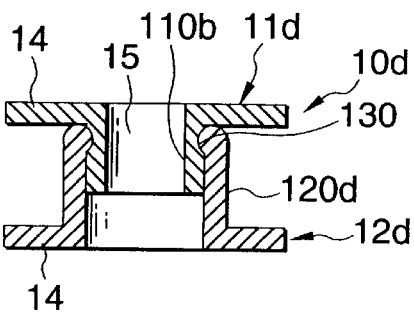
Figure 5D:
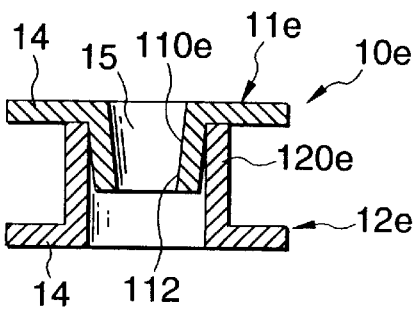
Figure 5E:
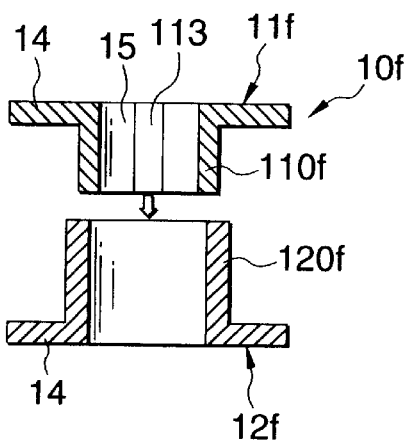

A vibration floating washer 10$d$ with a sleeve shown in FIG. 5C has the annular protrusion 130 formed on an upper end of the outer periphery of a female sleeve 120$d$. In the case of a vibration floating washer 10$c$ with a sleeve shown,in FIG. 5D, the opening edge side of a male sleeve 110$e$ is formed as a gently inclined surface 112, and the arrangement provided is such that both sleeves 110$e$ and 120$e$ are rubbed against each other so as to be fitted and fixed together. A vibration floating washer 10$f$ with a sleeve shown in FIG. 5E is formed of a metallic material having a spring characteristic, and the arrangement provided is such that a male sleeve 110$f$ having a slit 113 in the axial direction is press-fitted to a female sleeve 120$f$ so as to be fitted and fixed together.

Next, a description will be given of the metallic cushioning material, which is used as a metallic damping element.

FIGS. 6A to 6D show metallic cushioning materials 20$a$ to 20$d$ of the respective examples.

Figure 6A:
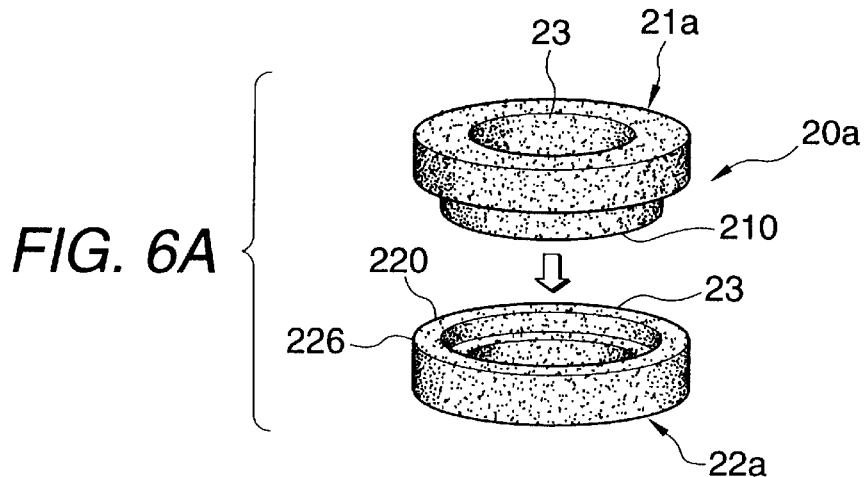
FIGS. 6A and 6B to 6D are exploded perspective views and exploded vertical cross-sectional views illustrating examples of the metallic cushioning material, respectively.

The metallic cushioning material 20$a$ shown in FIG. 6A includes a male 21$a$ and a female 22$a$ which are molded by compression-molding an SUS metal mesh and are both annular in shape. The male cushioning material 21$a$ has a projecting cross-sectional shape with an axially projecting portion 210 formed thereon, while the female cushioning material 22$a$ has is a recessed cross-sectional shape with an axially recessed portion 220 formed therein. Both the male cushioning material 21$a$ and the female cushioning material 22$a$ have respective through holes 23 through which the sleeves 110$a$, 110$b$, . . . and 120$a$, 120$b$, . . . of each of the above-described vibration floating washers 10$a$, 10$b$, . . . with a sleeve are passed.

Then, as shown in FIG. 2, a heat insulating plate 25 is clamped between a distal shoulder portion 225 of the nonprojecting portion of the male cushioning material 21$a$ and a distal end portion 226 of the female cushioning material 22$a$, is supported in noncontact with the vibration floating washer 10$a$ with a sleeve through the cushioning material 20$a$. Hence, it is possible to prevent the transmission of the vibration of a supporting portion 28 to the heat insulating plate 25.

This SUS metal mesh is molded under the following conditions.

Material: a stainless steel wire of SUS 316, SUS 3105, SUS 301, or SUS 304

Wire diameter: 0.05–0.35 mm

Weaving style: knitting in a unit of 1–5 strand(s) of the wire of the aforementioned diameter Density: 05–03 g/$^3$ Spring constant K: 0.01–10 kgf/mm Preferably, 0.1–2.0 kgf/mm It should be noted that these conditions are also applied to the metallic cushioning materials 20$b$–20$d$ which will be described below.

Figure 6B:
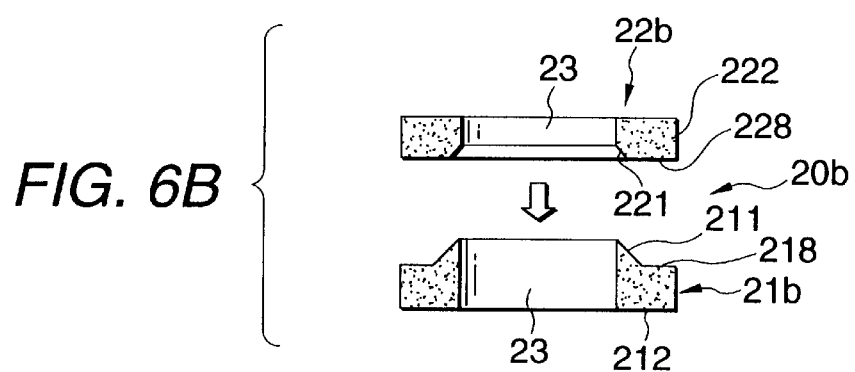

The metallic cushioning material 20$b$ shown in FIG. 6B is similarly comprised of a male cushioning material 21$b$ and a female cushioning material 22b. The male cushioning material 21b is formed as a ring 212 whose inner peripheral upper end side on the through hole 23 side is formed as an edged portion 211, while the female cushioning material 22b has a ring 222 whose inner peripheral lower end on the through hole 23 side is formed as a notched portion 221. The arrangement provided is such that, at the time of use, the inner peripheral edge of the heat insulating plate is clamped by an upper surface 218 of the ring 212 and a lower surface 228 of the ring 222.

Figure 6C:
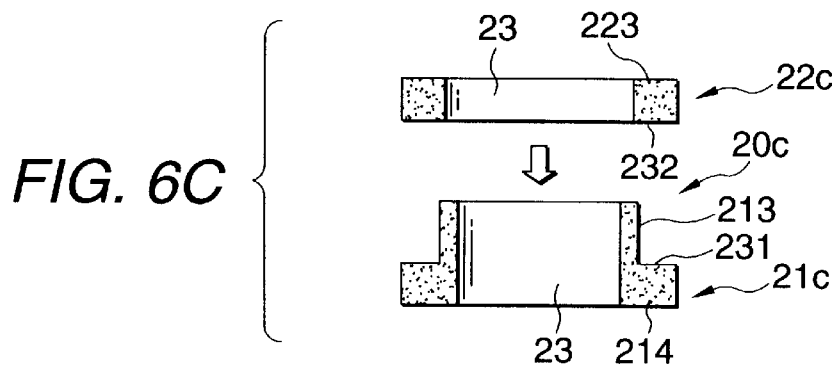

The metallic cushioning material 20c shown in FIG. 6C is comprised of a male cushioning material 21c and a female cushioning material 22c. The male cushioning material 21c is formed as a projecting portion 214 having an axially projecting portion 213 in its cross-sectional shape, while the female cushioning material 22c corresponding thereto is formed as a ring 223 whose cross-sectional shape is rectangular.

The arrangement provided is such that, at the time of use, the projecting portion 213 of the male cushioning material 21c is fitted to the Inner side of the ring 223 of the female cushioning material 22c, and the inner peripheral portion of the heat insulating plate is clamped by an upper surface 231, which forms a shoulder portion at a rear end of the projecting portion 213 of the male cushioning material 21c, and a lower surface 232 of the ring 223 of the female cushioning material 22c.

Figure 6D:
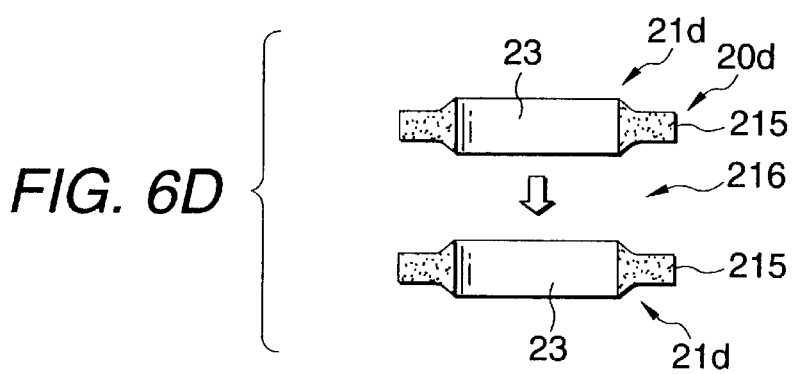
Figure 7:
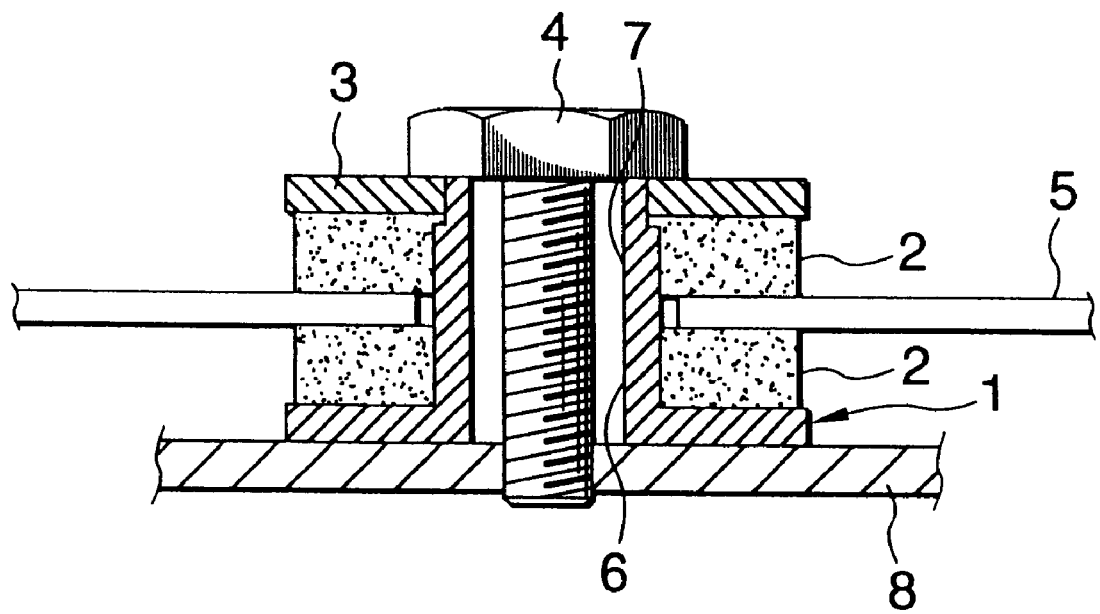
FIG. 7 is an explanatory vertical cross-sectional view illustrating a conventional attached state.

The metallic cushioning material 20d shown in FIG. 6D is comprised of a pair of cushioning materials 21d, each having a flared croso-sectional portion 215 whose through hole 23 side has a larger thickness. The arrangement provided is such that, at the time of use, the peripheral edge portion of the heat insulating plate is clamped in a space 216 which is formed between the pair of flared cross-sectional portions 215 when the two cushioning materials 21d are superposed on top of each other to abut against each other.

A description will now be given of a method of a method of attaching the vibration floating washers assembly in which each of the vibration floating washers 10a, 10b, . . . with a sleeve and each of the metallic cushioning materials 20a, 20b, . . . are assembled in advance onto the heat insulating plate 25.

FIG. 1 shows an example in which the vibration floating washer 10a (11a, 12a) with a sleeve and the metallic cushioning material 20a (21a, 22a ) are used. First, the projecting portion 210 of the male cushioning material 21a of the projecting shape is inserted in an attaching-bolt insertion hole 26 in the heat insulating plate 25, and the recessed portion 220 of the female cushioning material 22a is fitted to the projecting portion 210 from the opposite side of the heat insulating plate 25.

Then, the respective male and female sleeves 110a and 120a of the male washer 11a and the female washer 12a are inserted into the bolt insertion hole 26 from both sides thereof. The male sleeve 110a is then inserted into the female sleeve 120a, and the two members are fitted and fixed together by the fitting portion 13 by applying a pressing force thereto. Consequently, the heat insulating plate 25 is obtained to which the male and female washers 11a and 12a are fixed in the attaching-bolt insertion hole 26 with the male and female cushioning materials 21a and 22a placed therebetween. Reference numeral 27 denotes a fastening bolt.

FIG. 2 shows an example of use in which the vibration floating washer 10a with a sleeve and the metallic cushioning material 20a are used, and the heat insulating plate 25 is attached to the supporting portion 28 to be attached to by means of the fastening bolt 27 in the vibration floating structure.

FIG. 3 shows an example of use in which the vibration floating washer 10 with a sleeve and the metallic cushioning material 20d are used, and the inner side and the peripheral edge portion of the bolt inserting hole 26 of the heat insulating plate 25 are clamped in the space 216 formed by the flared cross-sectional portions 215 of the pair of cushioning materials 21d, so as to attach the vibration floating washer 10a with a sleeve in the vibration floating structure.

In the present invention, as described above, since, prior to attaching the heat insulating material to the supporting portion, the vibration floating washer with a sleeve is attached and fixed, in advance, to the attaching-bolt insertion hole in the heat insulating plate with the metallic cushioning material placed therebetween, it is possible to overcome the difficulties in the operation in the conventional assembly line and attain the simplification of the attaching operation. Further, it is possible to overcome other difficulties including the positioning of the bolt.

Further, the vibration floating washer with a sleeve and the metallic cushioning material which are used have simple construction, and can be provided at low cost.

While only a certain embodiments of the present invention have been specifically described herein, it will be apparent that numerous modifications may be made thereto without departing from the spirit and scope of the present invention.

The present invention is based on Japanese Patent Application No. Hei. 11-139230 which is incorporated herein by reference.

What is claimed is:

1. A method of attaching a vibration floating washer with a sleeve to a heat insulating plate including an attaching-bolt insertion hole, said vibration floating washer being attached with a metallic damping element placed therebetween, said vibration floating washer including a male washer and a female washer, said male washer and said female washer respectively including a male sleeve and a female sleeve, at least one of said male sleeve and said female sleeve including a fitting portion provided thereon, said method comprising:

disposing a cushioning element on the inside and the peripheral edge portion of the attaching-bolt insertion hole;

inserting said male sleeve of said male washer and said female sleeve of said female washer respectively into the bolt insertion hole from both sides of the heat insulating plate; and fitting and fixing said male washer and said female washers to each other with said fitting portion provided on at least one of said male sleeve and said female sleeve so that said heat insulating plate is maintained in a state of noncontact with both said male washer and said female washer, wherein said male sleeve includes holes on its surface, and said fitting portion is a discontinuous projecting portion and configured to have circular protrusions on a periphery of each hole thereon.

2. The method of attaching a vibration floating washer to a heat insulating plate according to claim 1, wherein said fitting portion, provided on at least one of said male sleeve and said female sleeve, is an annular projection portion or a discontinuous projecting portion.

3. The method of attaching a vibration floating washer to a heat insulating plate according to claim 1,
wherein said metallic damping element includes a male cushioning portion and a female cushioning portion,
wherein said male cushioning portion has a projecting cross-sectional shapewith an axiallyprojecting portion formed thereon, and said female cushioning portion has a recessed cross-sectional shape with an axially recessed portion formed therein, and wherein both said male cushioning element and said female cushioning element have respective through holes through which said male and female sleeves of said vibration floating washer are passed.

4. The method of attaching a vibration floating washer to a heat insulating plate according to claim 1, wherein said metallic damping element is molded by compression molding an SUS mesh.

5. A vibration floating washer assembly for being attached to a heat insulating plate including an attaching-bolt insertion hole, said washer assembly comprising:

a vibration floating washer with a sleeve, including:

a male washer including a male sleeve;

a female washer including a female sleeve; and a metallic damping element placed between said vibration floating washer, wherein at least one of said male sleeve and female sleeve includes a fitting portion provided thereon so that an attached heat insulating plate is maintained in a state of noncontact with both said male and female washers, wherein said fitting portion provided on at least one of said male sleeve and said female sleeve is a discontinuous projection portion, and wherein said male sleeve includes holes on its surface, and said discontinuous projection portion is configured to have circular protrusions on a periphery of each hole therein.

6. The vibration floating washer assembly according to claim 5, wherein said metallic damping element includes a male cushioning portion and a female cushioning portion, wherein said mail cushioning portion has a projection cross-sectional shape with an axially projecting portion formed thereon, and said female cushioning portion has a recessed cross-section shape with an axially recessed portion formed therein, and wherein both said male cushioning element and said female cushioning element have respective through holes through which said male and female sleeves of said vibration floating washer is passed.

7. The vibration floating washer assembly according to claim 5, wherein said metallic damping element is molded by compression molding an SUS mesh.

8. The vibration floating washer assembly according to claim 5, wherein said fitting portion provided on at least one of said male sleeve and said female sleeve is an annular projecting portion or discontinuous projecting portion.

* * * * *